United States Patent
Verdugo et al.

(10) Patent No.: US 10,240,591 B2
(45) Date of Patent: Mar. 26, 2019

(54) AIR OPERATED DIAPHRAGM PUMP

(71) Applicant: Flow Control LLC., Beverly, MA (US)

(72) Inventors: Christopher H. Verdugo, Yorba Linda, CA (US); Peter M. Wright, Harlow Essex (GB); Jimmie L. Jackson, Jr., Lago Vista, TX (US)

(73) Assignee: Flow Control LLC., Beverly, MA (US)

( * ) Notice: Subject to any disclaimer, the term of this patent is extended or adjusted under 35 U.S.C. 154(b) by 324 days.

(21) Appl. No.: 14/391,110

(22) PCT Filed: Apr. 9, 2013

(86) PCT No.: PCT/US2013/035794
§ 371 (c)(1),
(2) Date: Oct. 7, 2014

(87) PCT Pub. No.: WO2013/155079
PCT Pub. Date: Oct. 17, 2013

(65) Prior Publication Data
US 2015/0050161 A1    Feb. 19, 2015

Related U.S. Application Data

(60) Provisional application No. 61/621,738, filed on Apr. 9, 2012.

(51) Int. Cl.
*F04B 49/03* (2006.01)
*F04B 43/073* (2006.01)
(Continued)

(52) U.S. Cl.
CPC ........ *F04B 43/073* (2013.01); *F04B 43/0081* (2013.01); *F04B 43/0736* (2013.01);
(Continued)

(58) Field of Classification Search
CPC .. F04B 43/073; F04B 43/0081; F04B 49/106; F04B 49/03; F04B 2205/09;
(Continued)

(56) References Cited

U.S. PATENT DOCUMENTS 2,852,032 A * 9/1958 Moore .................. A62C 5/002
                                                          137/98
3,542,067 A   12/1970 Douglas
(Continued)

FOREIGN PATENT DOCUMENTS

| CN | 101737305 | 6/2010 |
|---|---|---|
| DE | 3502455 | 1/1985 |
| EP | 2136080 | 12/2009 |

OTHER PUBLICATIONS

CN101737305 English Language Abstract (2 pages), publication date Jun. 16, 2010.
(Continued)

*Primary Examiner* — Peter J Bertheaud
*Assistant Examiner* — Dnyanesh Kasture
(74) *Attorney, Agent, or Firm* — Ware, Fressola, Maguire & Barber LLP

(57) ABSTRACT

An air operated diaphragm pump is provided a housing having an orifice formed therein; a gas passageway configured to provide gas through the air operated diaphragm pump in order to pump syrup through the air operated diaphragm pump; a syrup passageway configured to provide the syrup through the air operated diaphragm pump when the gas is passed though the gas passageway, part of the syrup passageway configured in fluidic communication with the orifice of the housing with an inside pressure greater than an external pressure of the outside atmosphere when the syrup is provided through the air operate diaphragm pump; and an indicator arrangement configured or arranged in the orifice of the housing to communicate with the syrup pas-
(Continued)

sageway, and to respond or activate when a vacuum force exceeds a predetermined level and provide a visual indication when the syrup is no longer provided through the air operated diaphragm pump.

20 Claims, 11 Drawing Sheets

(51) Int. Cl.
- *F04B 43/00* (2006.01)
- *F04B 49/10* (2006.01)
- *G01L 19/10* (2006.01)

(52) U.S. Cl.
CPC ............ *F04B 49/03* (2013.01); *F04B 49/106* (2013.01); *G01L 19/10* (2013.01); *F04B 2205/02* (2013.01); *F04B 2205/09* (2013.01); *F04B 2207/70* (2013.01)

(58) Field of Classification Search
CPC .. F04B 2205/02; F04B 2207/70; G01L 19/10; Y10T 137/2496; Y10T 137/2703; Y10T 137/2514; Y10T 137/87161
See application file for complete search history.

(56) References Cited

U.S. PATENT DOCUMENTS

| | | |
|---|---|---|
| 3,830,405 A | 8/1974 | Jaeger |
| 4,341,330 A | 7/1982 | Mascia et al. |
| 4,494,574 A | 1/1985 | Casilli et al. |
| 4,500,264 A | 2/1985 | Lindner |
| 4,544,328 A | 10/1985 | Credle, Jr. |
| 4,555,222 A | 11/1985 | Casilli |
| 4,681,518 A | 7/1987 | Credle, Jr. |
| 4,705,458 A | 11/1987 | St. Laurent et al. |
| 4,708,827 A | 11/1987 | McMillin |
| 5,083,906 A | 1/1992 | Du |
| 5,361,943 A | 11/1994 | Du |
| 5,647,733 A | 7/1997 | Augustyn et al. |
| 5,664,940 A | 9/1997 | Du |
| 5,734,109 A | 3/1998 | Thanscheidt |
| 5,772,412 A | 6/1998 | Zytynski |
| 5,961,300 A | 10/1999 | Pitzer et al. |
| 5,992,239 A * | 11/1999 | Boehringer ......... A61M 1/0031 600/485 |
| 6,082,587 A | 7/2000 | Martindale et al. |
| 6,138,995 A | 10/2000 | Page |
| 6,189,736 B1 | 2/2001 | Phallen et al. |
| 6,193,109 B1 | 2/2001 | Credle, Jr. et al. |
| 6,193,111 B1 | 2/2001 | Adams |
| 6,253,960 B1 | 7/2001 | Bilskie et al. |
| 6,394,316 B1 | 5/2002 | Daansen |
| 6,564,971 B2 | 5/2003 | Heyes |
| 7,559,438 B2 | 7/2009 | Kosmyna et al. |
| 7,811,067 B2 | 10/2010 | Dietzsch et al. |
| 9,316,214 B2 * | 4/2016 | Du ......................... F04B 9/135 |
| 2004/0109769 A1 | 6/2004 | Jahn et al. |
| 2004/0136843 A1 | 7/2004 | Jahn et al. |
| 2005/0229981 A1 | 10/2005 | Frederiksen |
| 2006/0208913 A1* | 9/2006 | Christoffersen ..... B67D 1/0878 340/612 |
| 2010/0237097 A1* | 9/2010 | Fong ................... B67D 1/1243 222/61 |
| 2010/0308078 A1 | 12/2010 | Saveliev et al. |
| 2011/0168738 A1 | 7/2011 | Nevarez et al. |
| 2011/0286859 A1 | 11/2011 | Ortiz et al. |

OTHER PUBLICATIONS

DE3502455 English Language Abstract (1 page), publication date Jan. 25, 1985.

* cited by examiner

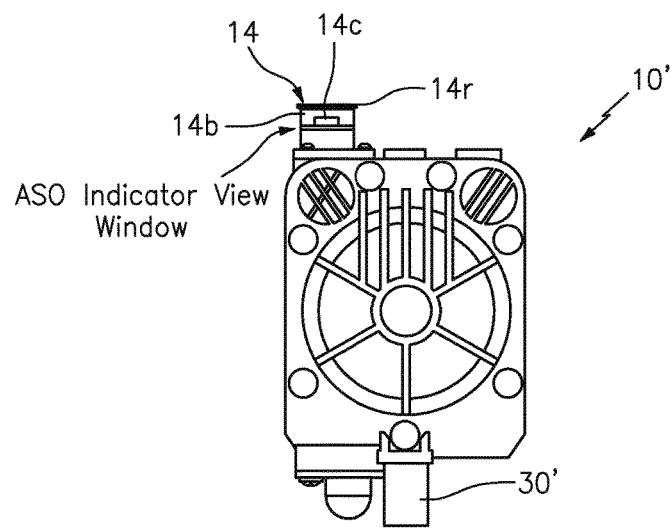
FIG. 5
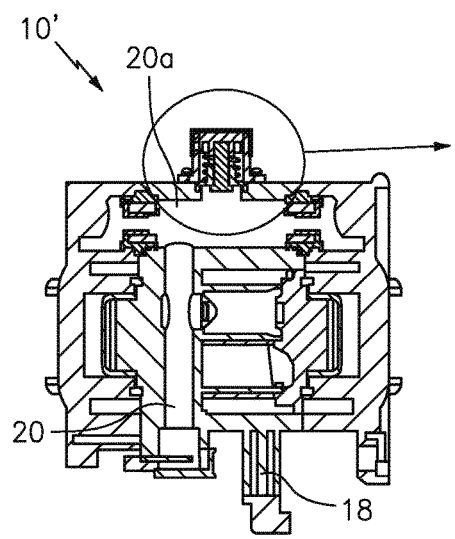
FIG. 6a
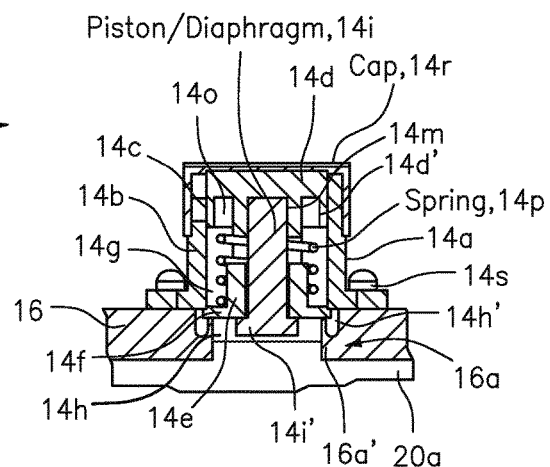
FIG. 6b
FIG. 6

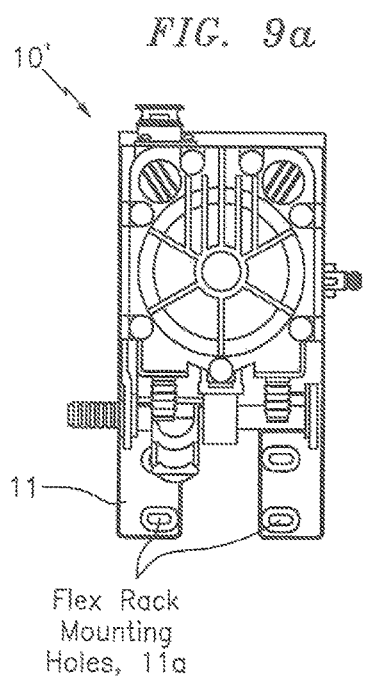
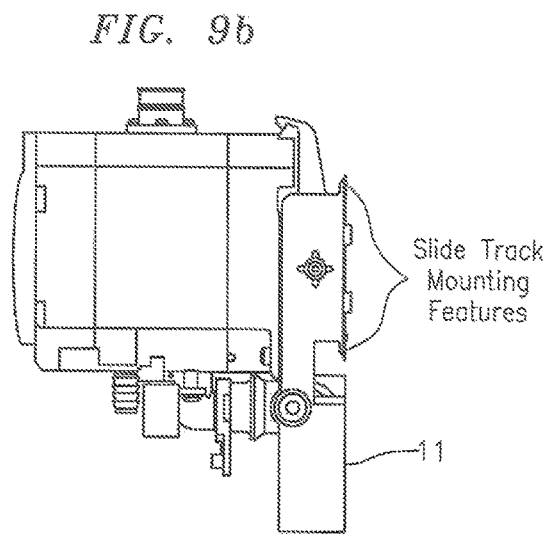
FIG. 9a  FIG. 9b
Slide Track Mounting Features
Flex Rack Mounting Holes, 11a
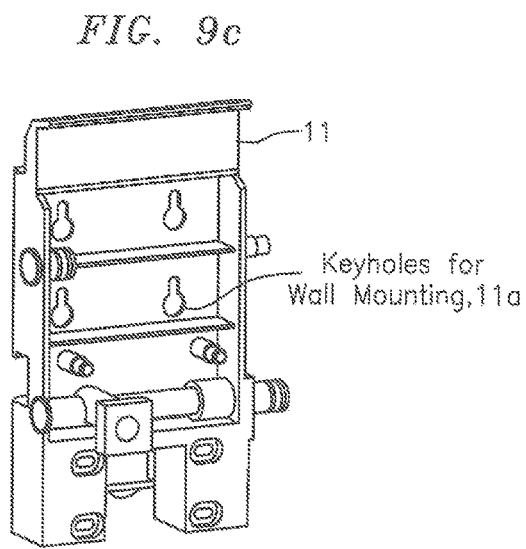
FIG. 9c
Keyholes for Wall Mounting, 11a
FIG. 9

AIR OPERATED DIAPHRAGM PUMP

CROSS-REFERENCE TO RELATED APPLICATIONS

This application corresponds to international patent application serial no. PCT/US2013/035794, filed 9 Apr. 2013, which claims benefit to provisional patent application Ser. No. 61/621,738, filed 9 Apr. 2012, which is hereby incorporated by reference in its entirety.

BACKGROUND OF THE INVENTION

1. Field of the Invention

The present invention relates to a pump; and more particularly relates to a diaphragm pump, e.g., for use in a soft drink dispenser.

2. Brief Description of Related Art

Pump are known in the art that use compressed gas to drive a reciprocating piston which in turn, creates a variable volume displacement and transfers pressure to the fluid. See U.S. Pat. No. 5,664,940, which is hereby incorporated by reference in its entirety. In operation, the device moves the fluid under pressure from a storage container called the Bag-In-Box (BIB) to the soft drink dispenser.

In addition, these types of pumps typically may have a vacuum actuated gas shutoff valve incorporated into the design. The ASO (automatic shutoff) valve stops the flow of gas to the pump when the vacuum reaches a specific value.

By way of example, such known pumps may include, or take the form of, an air-operated pump, which is generally a low cost work horse pump used for transferring any type of liquid, e.g., including fluid from a bag to a beverage dispenser, as well sludge. The pump may include inlet and outlet valves that take the form of flap or ball valves. The pump also includes two circular chambers each split by a large elastomeric diaphragm. The two diaphragm centers may be mechanically coupled together with a shaft. An interlocked valve admits air pressure to one side of one of the chambers and exhaust the air from the opposite side of the other chamber. This causes both diaphragms to move. One diaphragm pushing fluid out through a non-return valve. The other diaphragm drawing fluid in through another non-return valve. On completion of a full stroke the valve reverses the air supply and exhaust directions causing the diaphragms to move back. The diaphragm which was pushing fluid out of the pump now sucks fluid and the diaphragm admitting fluid now pushes fluid out. The system is therefore double acting. See also U.S. Pat. Nos. 4,94,574; 4,500,264 and 4,555,222, which are all incorporated by reference in their entirety.

Each pump is mounted to a specialized mounting bracket specified by our customer. There are three distinct mounting configurations: wall mount, slide track mounting and UMB (universal modular board).

Since the ASO in most BIB pumps is activated at a predetermined value, there is typically no means of adjustment. Occasionally, the shutoff value requires fine tuning to compensate for altitude considerations however most pumps do not accommodate this feature.

Currently, when the ASO is activated there is no way for the end user to identify the state of the syrup system. If the soft drink dispenser is not dispensing syrup, some users are not able to troubleshoot and identify the need to change the syrup supply. Consequently, a service call is initiated at a cost to the syrup supplier.

The current pump is mounted with other pumps such that they share a common gas supply through a distribution manifold. This manifold is assembled at the factory and utilizes components that are expensive. In addition, when removing the pump from service, a separate activity is required to disconnect the gas source from the pump.

In view of this, there is a need in the marketplace for such a pump to be able to be adjusted by the end user, and for the end user to identify the state of the syrup system.

SUMMARY OF THE INVENTION

The Indicator (No Fluid/Syrup Flowing)

According to some embodiments, the present invention may include, or take the form of apparatus, such as an air operated diaphragm pump featuring a housing, a gas passageway, a fluid passageway and an indicator arrangement.

The housing may be configured with an orifice.

The gas passageway may be configured to provide gas through the air operated diaphragm pump in order to pump fluid through the air operated diaphragm pump.

The fluid passageway may be configured to respond to the gas passing though the gas passageway and provide the fluid through the air operated diaphragm pump, and also configured with a suction plenum or channel in fluidic communication with the orifice of the housing. By way of example, the suction plenum or channel may be formed by or as an enclosed space with an inside pressure that is greater than an external pressure of the outside atmosphere when the fluid is being provided through the air operated diaphragm pump via the fluid passageway.

The indicator arrangement may be configured in relation to the orifice of the housing to communicate with the suction plenum or channel, and also configured to respond or activate when a vacuum force exceeds a predetermined level and provide a visual indication when the fluid is no longer being provided through the air operated diaphragm pump via the fluid passageway. By way of example, the vacuum force may be cause by the continued provisioning of the gas through the air operated diaphragm pump when the fluid is no longer being provided through the air operated diaphragm pump via the fluid passageway.

According to some embodiments of the present invention, the apparatus may include one or more of the following features:

The indicator arrangement may include an indicator housing member configured with an outer cylindrical wall portion having a window, the indicator housing member being configured in relation to the orifice in the housing; and a retainer member configured with a cylindrical surface having some indicia arranged thereon to provide the visual indication in the window when the fluid is no longer being provided through the air operated diaphragm pump via the fluid passage.

The indicator arrangement may also include an indicator housing member having a U-shaped cylindrical configuration with an outer cylindrical wall portion, an inner cylindrical wall portion and a connecting portion coupling the outer cylindrical wall portion and the inner cylindrical wall portion together so as to form a channel inbetween, the indicator housing member being configured in relation to the orifice in the housing; and a diaphragm configured in relation to the orifice to provide a seal between a circumferential rim of the orifice and the connecting portion of the U-shaped cylindrical configuration.

The indicator arrangement may also include a piston configured to move inside the inner cylindrical wall portion of the U-shaped cylindrical configuration and configured with one end portion fixedly coupled to a center portion of the diaphragm.

The indicator arrangement may also include a retainer member having a corresponding U-shaped cylindrical configuration with a corresponding outer cylindrical wall portion, a corresponding inner cylindrical wall portion and a corresponding connecting portion coupling the corresponding outer cylindrical wall portion and the corresponding inner cylindrical wall portion together so as to form a corresponding channel inbetween, the corresponding inner cylindrical wall configured to form an inner cavity portion to receive another end portion of the piston, the corresponding outer cylindrical wall portion configured to move in relation to the outer cylindrical wall portion of the U-shaped cylindrical configuration and configured with a cylindrical surface having some indicia arranged thereon to provide the visual indication in the window of the U-shaped cylindrical configuration when the fluid is no longer being provided through the air operated diaphragm pump via the fluid passage.

The indicator arrangement may also include an elastic member configured to be arranged in the channel of the U-shaped cylindrical configuration and the corresponding channel of the corresponding U-shaped cylindrical configuration in compression between the indicator housing member and the retainer member.

The indicator arrangement may also include a transparent cap configured to engage frictionally an outside portion of the outer cylindrical wall portion of the U-shaped cylindrical configuration to hold, retain and contain the indicator arrangement together and to allow the viewing of the visual indication when the fluid is no longer being provided through the air operated diaphragm pump via the fluid passage.

The indicator arrangement may also include a flange configured to fasten the indicator arrangement to the housing in relation to the orifice.

The indicator arrangement may be located on a top surface of the pump so as to be viewable.

The indicator arrangement may also include a diaphragm having a peripheral portion; and the housing may be configured with a circumferential channel to receive the peripheral portion of a diaphragm.

According to some embodiments of the present invention, the indicator arrangement may include, or take the form of, the following combination:
- an indicator housing member having a U-shaped cylindrical configuration with an outer cylindrical wall portion, an inner cylindrical wall portion and a disk-like connecting portion coupling the outer cylindrical wall portion and the inner cylindrical wall portion together so as to form a channel inbetween, the outer cylindrical wall portion being configured with a window, the indicator housing member being configured in relation to the orifice in the housing;
- a diaphragm configured in relation to the orifice to provide a seal between a circumferential rim of the orifice and the disk-like connecting portion of the U-shaped cylindrical configuration;
- a piston configured to move inside the inner cylindrical wall portion of the U-shaped cylindrical configuration and configured with one end portion fixedly coupled to a center portion of the diaphragm;
- a retainer member having a corresponding U-shaped cylindrical configuration with a corresponding outer cylindrical wall portion, a corresponding inner cylindrical wall portion and a corresponding disk-like connecting portion coupling the corresponding outer cylindrical wall portion and the corresponding inner cylindrical wall portion together so as to form a corresponding channel inbetween, the corresponding inner cylindrical wall configured to form an inner cavity portion to receive another end portion of the piston, the corresponding outer cylindrical wall portion configured to move in relation to the outer cylindrical wall portion of the U-shaped cylindrical configuration and configured with a cylindrical surface having some indicia arranged thereon to provide the visual indication in the window of the U-shaped cylindrical configuration when the fluid is no longer being provided through the air operated diaphragm pump via the fluid passage; and
- an elastic member configured to be arranged in the channel of the U-shaped cylindrical configuration and the corresponding channel of the corresponding U-shaped cylindrical configuration in compression between the indicator housing member and the retainer member; and
- a transparent cap configured to engage an outside portion of the outer cylindrical wall portion of the U-shaped cylindrical configuration to hold, retain and contain the indicator arrangement together and to allow the viewing of the visual indication when the fluid is no longer being provided through the air operated diaphragm pump via the fluid passage.

One advantage of the present invention is that the end user will be able to easily identify when the fluid, e.g., from the syrup source such as a bag of the fluid, requires replacement.

The ASO Arrangement

According to some embodiments, the present invention may include, or take the form of apparatus, such as an air operated diaphragm pump featuring a gas passageway, a fluid passageway and an automatic shutoff (ASO) arrangement.

The gas passageway may be configured to provide gas through the air operated diaphragm pump in order to pump fluid, such as syrup from a bag or container to a beverage dispenser, through the air operated diaphragm pump.

The fluid passageway may be configured to respond to the gas passing though the gas passageway and provide the fluid through the air operated diaphragm pump.

The automatic shutoff (ASO) arrangement may be configured in relation to the gas passageway and the fluid passageway, and also configured to respond or activate when a vacuum force exceeds a predetermined level when the fluid is no longer being provided through the air operated diaphragm pump via the fluid passageway and to stop the gas from passing though the gas passageway and the air operated diaphragm pump.

According to some embodiments of the present invention, the apparatus may include one or more of the following features:

The ASO arrangement may include a valve body, a plunger shaft, a piston/diaphragm arrangement and a gas valve arrangement.

The valve body may be configured to be in communication with the gas passageway on a first end and the fluid passageway on a second end, and also configured to allow the gas to pass through in order to pump the fluid through the air operated diaphragm pump.

The plunger shaft may be arranged to move in the valve body.

The piston/diaphragm arrangement may be arranged on one end of the plunger shaft.

The gas valve arrangement may be arranged on another end of the plunger shaft;

In operation, the piston/diaphragm arrangement may be configured to respond when the vacuum force exceeds the predetermined level when the fluid is no longer being provided through the air operated diaphragm pump via the fluid passageway, to move the plunger shaft in the valve body, and to cause the gas valve arrangement to stop the gas from passing though the gas passageway and the air operated diaphragm pump.

The piston/diaphragm arrangement may include a diaphragm coupled to the second end of the valve body to seal the fluid passageway from the gas passageway.

The gas valve arrangement may include a gas valve configured on the other end of the plunger shaft to stop the gas from passing though the gas passageway and the air operated diaphragm pump.

The gas valve arrangement may include an O-ring configured between the plunger shaft and an inner gas channel portion of the valve body; and the gas valve may be configured to move against the O-ring and stop the gas from passing though the gas passageway and the air operated diaphragm pump.

The piston/diaphragm arrangement may be configured to respond when the vacuum force does not exceed the predetermined level when the fluid is being provided through the air operated diaphragm pump via the fluid passageway, to move the plunger shaft in the valve body, and to cause the gas valve arrangement to allow the gas to pass though the gas passageway and the air operated diaphragm pump.

The ASO arrangement may also include an adjusting gland and an elastic member, such as a coil spring, configured to adjust the predetermined level that the vacuum force may need to exceed when the fluid is no longer being provided through the air operated diaphragm pump via the fluid passageway in order to stop the gas from passing though the gas passageway and the air operated diaphragm pump. The adjusting gland may be configured to be adjusted by being screwed into and/or out of the housing, e.g., to compress or relax the compression of the elastic member.

The Combination of an ASO Indicator and ASO Arrangement

According to some embodiments, the present invention may include, or take the form of apparatus, such as an air operated diaphragm pump, featuring the ASO arrangement in combination with an ASO indicator.

In the combination, the air operated diaphragm pump may include a housing, a gas passageway, a fluid passageway, an automatic shutoff (ASO) arrangement and an ASO indicator arrangement.

The housing may be configured with an orifice.

The gas passageway may be configured to provide gas through the air operated diaphragm pump in order to pump fluid through the air operated diaphragm pump.

The fluid passageway may be configured to respond to the gas passing though the gas passageway and provide the fluid through the air operated diaphragm pump, and also configured with a suction plenum or channel in fluidic communication with the orifice of the housing.

The automatic shutoff (ASO) arrangement may be configured in relation to the gas passageway and the fluid passageway, and also configured to respond or activate when a vacuum force exceeds a predetermined level when the fluid is no longer being provided through the air operated diaphragm pump via the fluid passageway and to stop the gas from passing though the gas passageway and the air operated diaphragm pump.

The indicator arrangement may be configured in relation to the orifice of the housing to communicate with the suction plenum or channel, and also configured to respond or activate when the vacuum force exceeds the predetermined level and provide a visual indication when the fluid is no longer being provided through the air operated diaphragm pump via the fluid passageway.

The combination may also include alone or in further combination one or more of the additional features set forth herein.

BRIEF DESCRIPTION OF THE DRAWING

The drawing, which are not necessarily drawn to scale, includes the following Figures:

FIG. 5 shows a front view of an air-operated pump, according to some embodiments of the present invention.

FIG. 6 includes FIGS. 6a and 6b, where FIG. 6a shows one cross-sectional view of the air-operated pump shown in FIG. 5, and where FIG. 6b shows an exploded view an ASO indicator that forms part of the shown in the air-operated pump shown in FIG. 6a, all according to some embodiments of the present invention.

FIG. 9 includes FIGS. 9a and 9b, where FIG. 9a shows a front view of the air-operated pump shown in FIG. 5, and where FIG. 9b shows a side view of the air-operated pump shown in FIG. 9a, all according to some embodiments of the present invention.

FIG. 12a shows a front-to-back cross-sectional view of an air-operated pump according, where FIG. 12b shows an exploded view an ASO device in an open position with gas flowing that forms part of the shown in the air-operated pump shown in FIG. 12a, and where FIG. 12c shows an exploded view an ASO device in a closed position without gas flowing that forms part of the shown in the air-operated pump shown in FIG. 12a, all according to some embodiments of the present invention.

FIG. 13a shows a view of the air-operated pump with the indicator not showing, and where FIG. 13b shows a view of the air-operated pump with the indicator showing, all according to some embodiments of the present invention.

Figure 1:
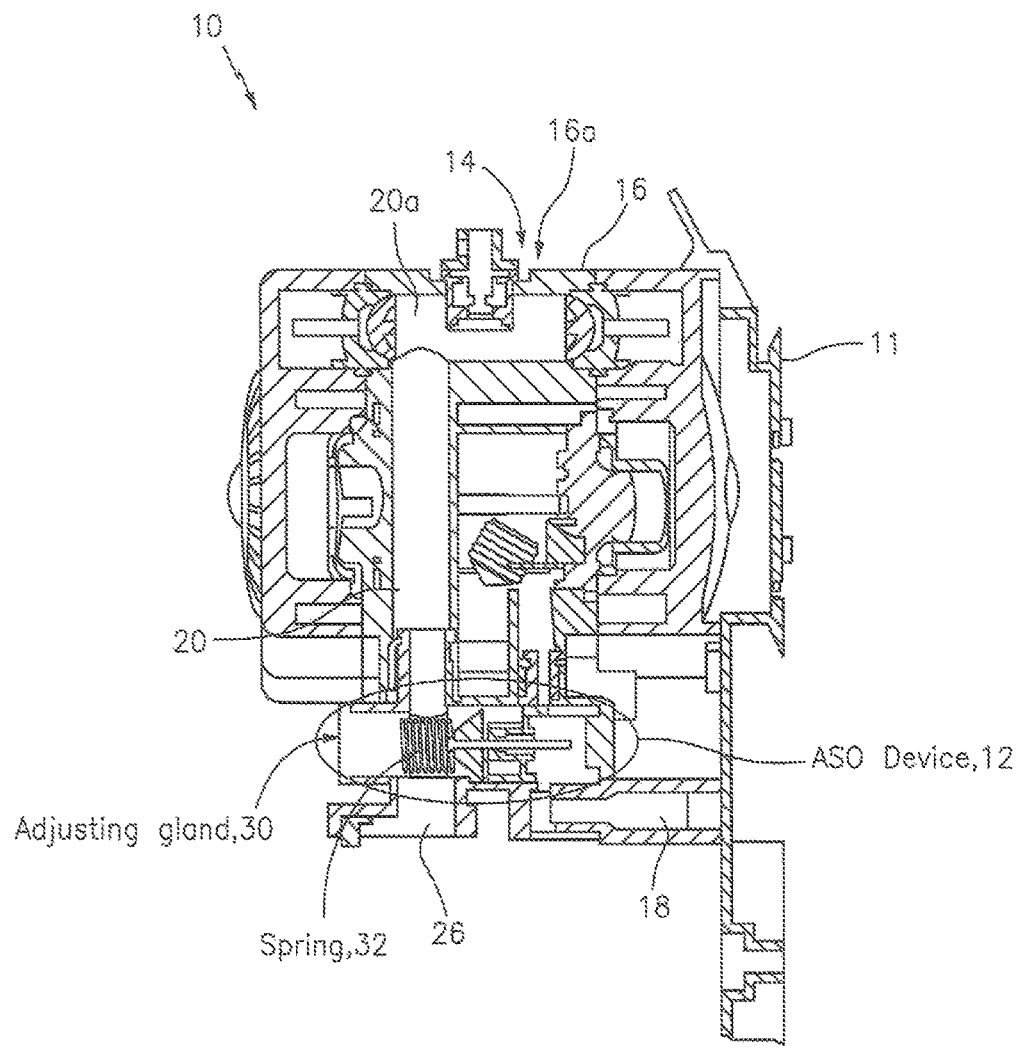
FIG. 1 shows a front-to-back cross-sectional view of an air-operated pump according, according to some embodiments of the present invention.

Figures in the drawing are populated with lead lines and reference numerals so as to read consistent with the specification. However, for the sake of reducing clutter in the drawing as a whole, each Figures does not contain every lead line and reference numeral.

DETAILED DESCRIPTION OF THE INVENTION

FIGS. 1-4

In general, by configuring components in the ASO arrangement or subassembly, the ASO arrangement has been designed such that it is adjustable, e.g., though the exterior of the housing of the pump.

An additional arrangement or subassembly has also been added to the exterior of the pump, which provides an indication of the pump state by sensing vacuum in the suction channel internal to the pump. The user will be able to easily identify the syrup source requiring replacement.

The present invention also utilizes a new mounting system that incorporates a gas manifold in addition to features designed to restrain the pump to the mounting surface (rack or wall).

Figure 2:
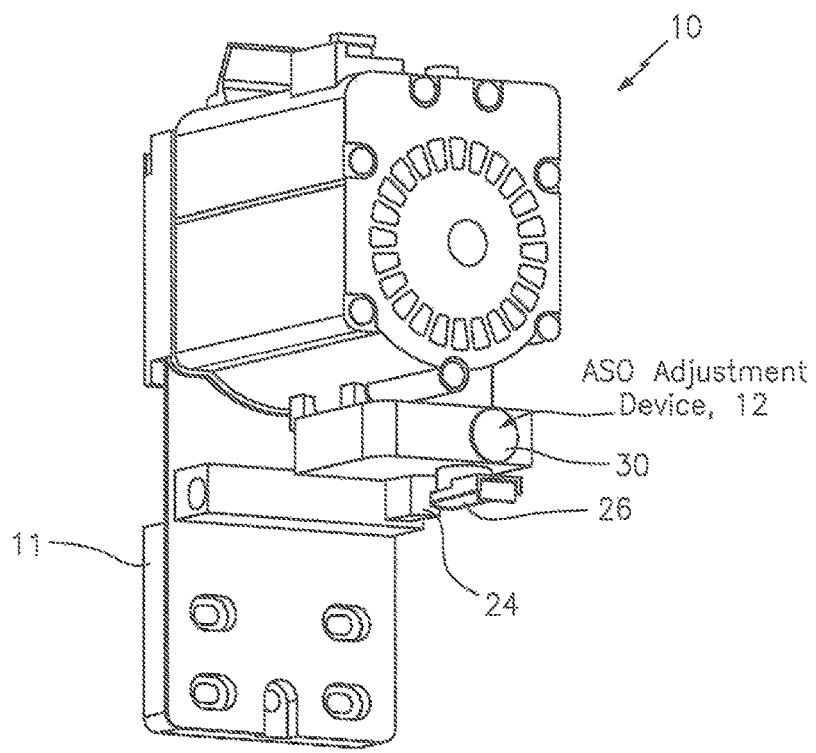
FIG. 2 shows a bottom perspective view of the air-operated pump shown in FIG. 1, according to some embodiments of the present invention.

The new design of the ASO arrangement or subassembly also utilizes a compression spring to apply a load to the system which in turn modulates the closing of the gas valve. The applied load to the system can be varied simply by varying the working height of the spring through an arrangement of mechanical components (see FIG. 1). The ASO arrangement or subassembly is positioned such that it can be accessed from the exterior of the pump (FIG. 2).

Figure 3:
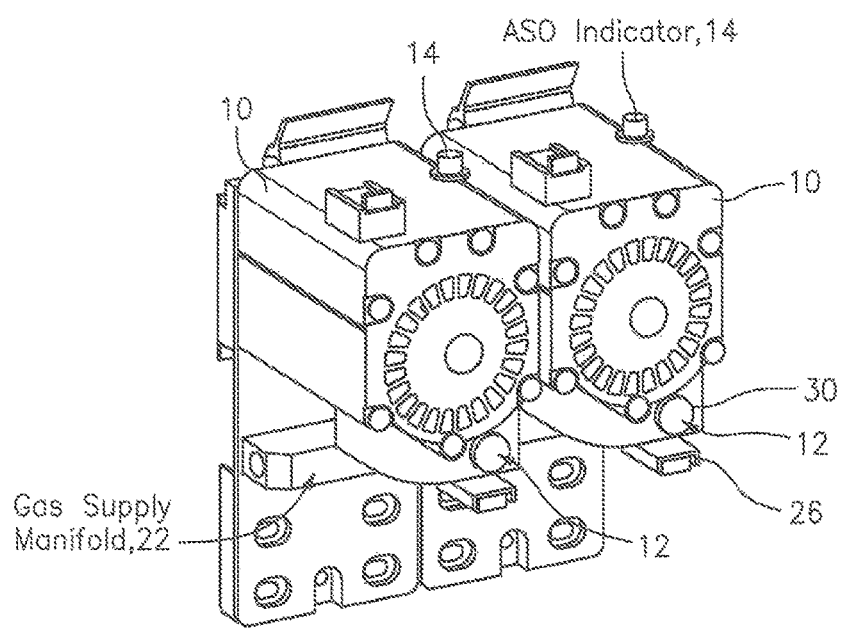
FIG. 3 shows a top perspective view of side-by-side air-operated pumps like that shown in FIG. 1, according to some embodiments of the present invention.

The ASO indicator is located at the top surface of the pump and is viewable from the opposing direction (direction of inspection from restaurant operator). The ASO indicator utilizes components (FIG. 3) configured such that the indicator activates when predetermined vacuum levels are achieved. As the vacuum increases in the suction channel (due to a lack of syrup), the piston diaphragm is pulled inward against the spring via the spring retainer to a prescribed displacement revealing, e.g., a red strip that becomes visible through the window (FIG. 1).

Figure 4:
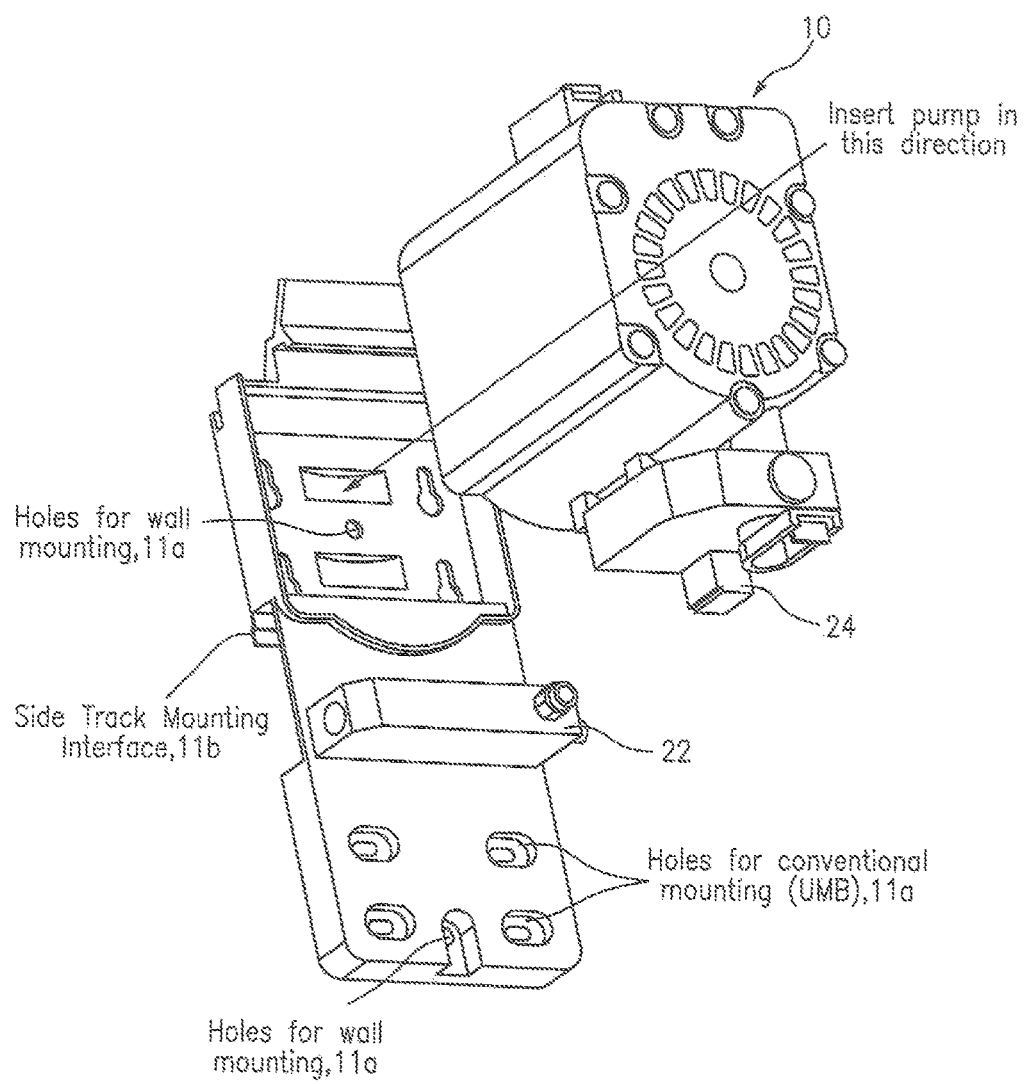
FIG. 4 shows a bottom perspective view of an air-operated pump detached from a bracket, according to some embodiments of the present invention.

The mounting bracket has two distinct interfacing features. The first surface features geometry designed to mate with the slide track mounting system, conventional rack mounting system, and a traditional wall mount. The secondary surface is designed to mate with the pump in a way such that it works in conjunction with the gas manifold system (FIG. 4).

In particular, and by way of example, FIGS. 1-4 show that the present invention may include, or take the form of apparatus, such as an air-operated pump generally indicated as 10 featuring an automatic shutoff (ASO) device 12 in combination with an ASO indicator arrangement 14, according to some embodiments of the present invention. In FIG. 1-4, the air-operated pump is mounted on a bracket or mounting plate 11. The air-operated pump 10 may include a housing 16, a gas passageway 18 and a fluid passageway 20.

The housing 16 may be configured with an orifice 16a (see also FIG. 6) formed therein.

The gas passageway 18 may be configured to provide gas through the air operated diaphragm pump 10 in order to pump fluid through the air operated diaphragm pump 10. The gas may be provided to the pump 10 via a gas supply manifold 22 from a gas source (not shown) coupled via tubing to a gas inlet fitting or port 18a (FIG. 10) and provided from the pump via a gas outlet fitting or port. The pump 10 couples to the gas supply manifold 22 via a gas supply manifold coupling port 24 (FIG. 4).

The fluid passageway 20 may be configured to respond to the gas passing though the gas passageway and provide the fluid through the air operated diaphragm pump, and also configured with a suction plenum or channel 20a in fluidic communication with the orifice of the housing. By way of example, the suction plenum or channel 20a may be formed by or as an enclosed space with an inside pressure that is greater than an external pressure of the outside atmosphere when the fluid is being provided through the air operated diaphragm pump 10 via the fluid passageway 20. By way of example, the fluid may be pumped from a storage bag (not shown) containing the fluid, through the air operated diaphragm pump 10, to a beverage dispensing machine or device (not shown), although the scope of the invention is not intended to be limited to where the fluid originated, or to where the fluid is being pumped. The pump 10 has a fluid inlet port 26 for coupling hosing from the storage bag (not shown).

The automatic shutoff (ASO) device or arrangement 12 may be configured in relation to the gas passageway 18 and the fluid passageway 20, and also configured to respond or activate when a vacuum force exceeds a predetermined level when the fluid is no longer being provided through the air operated diaphragm pump 10 via the fluid passageway 20 and to stop the gas from passing though the gas passageway 18 and the air operated diaphragm pump 10. The details of the operation of the ASO device or arrangement are set forth in relation to FIG. 12 below.

The indicator arrangement 14 may be configured in relation to the orifice 16a (see also FIG. 6) of the housing 16 to communicate with the suction plenum or channel 20a, and also configured to respond or activate when a vacuum force exceeds a predetermined level and provide a visual indication when the fluid is no longer being provided through the air operated diaphragm pump 10 via the fluid passageway 20. By way of example, the vacuum force may be cause by the continued provisioning of the gas through the air operated diaphragm pump 10 when the fluid is no longer being provided through the air operated diaphragm pump 10 via the fluid passageway 20, consistent with that set forth below. The details of the operation of the indicator device or arrangement 14 are set forth in relation to FIG. 12 below.

In FIG. 4, the bracket 11 is configured with holes 11a for wall mounting and a slide track mounting interface 11b.

FIGS. 1-4 also show other parts and component that form part of the pump 10, but that do not form part of the underlying invention, thus are not described in further detail. A person skilled in the art would appreciate what these other parts and component are, and how they work to make the pump operate, consistent with that set forth herein, including the prior art pumps set forth above, and incorporated by references in their entirety.

FIGS. 5-13

In particular, and further by way of example, FIGS. 5-13 show that the present invention may include, or take the form of, apparatus, such as an air-operated pump generally indicated as 10' featuring an automatic shutoff (ASO) device 12' in combination with an ASO indicator arrangement 14, according to some embodiments of the present invention. In general, parts and components in FIGS. 5-13 that are similar to parts and components in FIGS. 1-4 are labeled with similar references numerals.

When comparing the pump 10 in FIGS. 1-4 to the pump 10' in FIGS. 5-13 there are two basic differences.

First, the ASO arrangement 12 is arranged in the lower part of the pump 10 in FIGS. 1-4, while the ASO arrangement 12 is arranged in the middle part of the pump 10' in FIGS. 5-13. While the basic operation of the ASO arrangements 12, 12' in FIGS. 1-4 and 5-12 is substantially the same, there are some minor differences, thus the same reference numeral is not used for both devices or arrangements.

Second, the ASO indicator 14 is arranged on the right side of the pump 10 in FIGS. 1-4, while the ASO indicator 14 is arranged on the left side of the pump 10' in FIGS. 5-12. The basic operation of the ASO indicator in FIGS. 1-4 and 5-12 is substantially the same, thus the same reference numeral is used for both devices or arrangements. For example, in FIGS. 1-4 the adjusting gland 30 is configured on the front part of the pump 10 and may be turned to adjust the compression of spring 32. In contrast, in FIGS. 5-13 the adjusting gland 30' is configured on the bottom part of the pump 10 and may be turned to adjust the compression of spring 32'.

In general, the ASO indicator 14 is located at the top surface of the pump 10' and is viewable from the opposing direction (direction of inspection from restaurant operator) (see FIG. 5). The ASO indicator 14 utilizes components (see FIG. 6) configured such that the indicator activates when predetermined vacuum levels are achieved.

FIG. 6: The Indicator Arrangement 14

Figure 13:
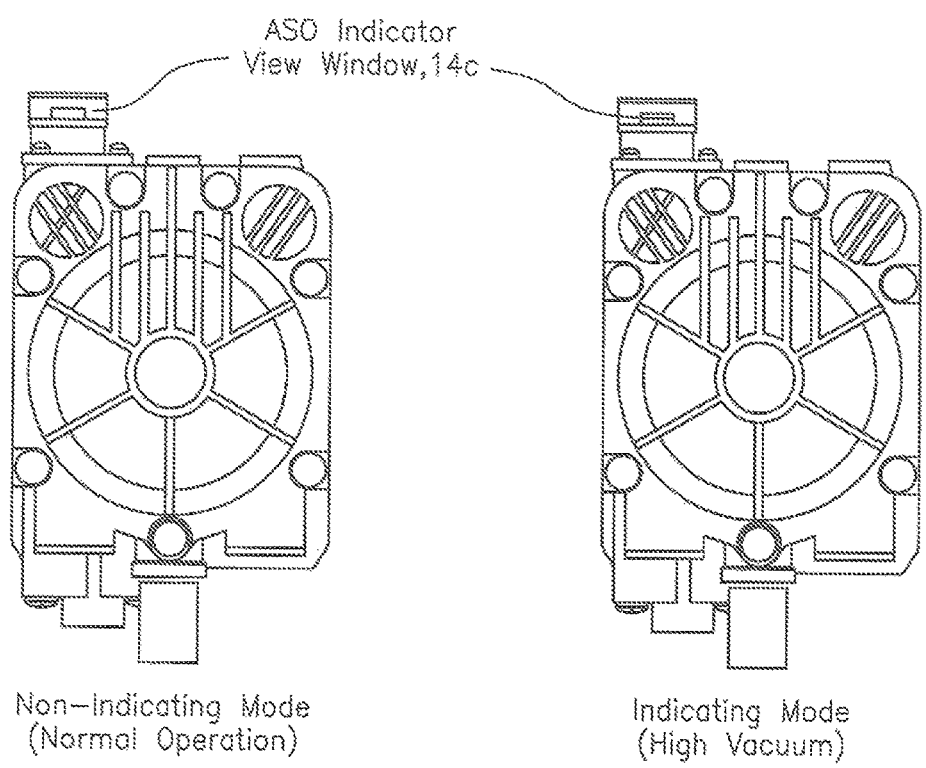
FIG. 13 includes FIGS. 13a and 13b, where

In FIG. 6, the indicator arrangement 14 may include an indicator housing member 14a configured with an outer cylindrical wall portion 14b having a window 14c formed therein (FIG. 6b). The indicator housing member 14a may be configured in relation to the orifice 16a formed in the housing 16. A retainer member 14d may be configured with a cylindrical surface 14d' having some indicia arranged thereon to provide the visual indication in the window when the fluid is no longer being provided through the air operated diaphragm pump via the fluid passage. FIG. 13 shows the ASO indicator in the form of indicia that takes the form of a strip that does not appear in the window 14c in FIG. 13a, and that appears in the window 14c in FIG. 13b.

The indicator housing member 14a has a U-shaped cylindrical configuration with the outer cylindrical wall portion 14b, an inner cylindrical wall portion 14e and a connecting portion 14f coupling the outer cylindrical wall portion 14b and the inner cylindrical wall portion 14e together so as to form a channel 14g inbetween. The indicator housing member 14a may be configured in relation to the orifice 16a formed in the housing 16; and a diaphragm 14h may be configured in relation to the orifice 16a to provide a seal or sealing arrangement between a circumferential rim and/or channel 16a' of the orifice 16a and the connecting portion 14f of the U-shaped cylindrical configuration.

The indicator arrangement 14 may also include a piston 14i configured to move inside the inner cylindrical wall portion 14e of the U-shaped cylindrical configuration and configured with one end portion 14i' fixedly coupled to a center portion of the diaphragm 14h.

The retainer member 14d may include a corresponding U-shaped cylindrical configuration with a corresponding outer cylindrical wall portion 14l, a corresponding inner cylindrical wall portion 14m and a corresponding connecting portion 14n coupling the corresponding outer cylindrical wall portion 14l and the corresponding inner cylindrical wall portion 14m together so as to form a corresponding channel 14o inbetween. The corresponding inner cylindrical wall 14m may be configured to form an inner cavity portion to receive another end portion of the piston, as shown, the corresponding outer cylindrical wall portion may be configured to move in relation to the outer cylindrical wall portion 14b of the U-shaped cylindrical configuration and configured with the cylindrical surface 14b' having the indicia arranged thereon to provide the visual indication in the window of the U-shaped cylindrical configuration when the fluid is no longer being provided through the air operated diaphragm pump via the fluid passage.

The indicator arrangement 14 may also include an elastic member 14p configured to be arranged in the channel 14g of the U-shaped cylindrical configuration and the corresponding channel 14o the corresponding U-shaped cylindrical configuration in compression between the indicator housing member 14a and the retainer member 14d.

The indicator arrangement 14 may also include a transparent cap 14r configured to engage frictionally an outside portion of the outer cylindrical wall portion 14b of the U-shaped cylindrical configuration to hold, retain and contain the indicator arrangement 14 together and to allow the viewing of the visual indication when the fluid is no longer being provided through the air operated diaphragm pump via the fluid passage.

The indicator arrangement 14 may also include a flange 14s configured to fasten the indicator arrangement 14 to the housing 16 in relation to the orifice 16a.

The diaphragm 14h having a peripheral portion 14h'; and the orifice 16a of the housing 16 may be configured with the circumferential rim and/or channel 16a' to receive and retain the peripheral portion 14h' of the diaphragm 14h.

Consistent with that shown in FIG. 1, the ASO arrangement 12 may also include an adjusting gland 30 and an elastic member 32, such as a coil spring, configured to adjust the predetermined level that the vacuum force may need to exceed when the fluid is no longer being provided through the air operated diaphragm pump 10 via the fluid passageway 20 in order to stop the gas from passing though the gas passageway 18 and the air operated diaphragm pump 10. The adjusting gland 30 may be configured to be adjusted by being screwed into and/or out of the housing 16, e.g., to compress or relax the compression of the elastic member 32.

Figure 12:
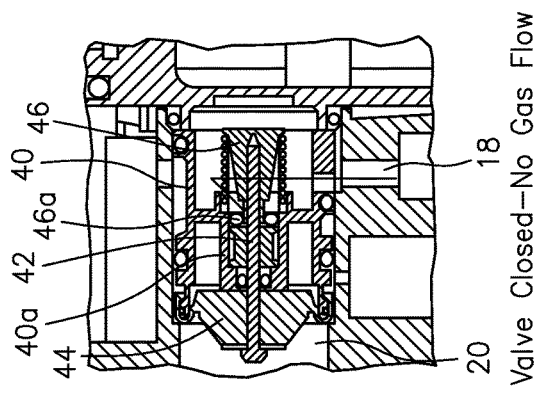
FIG. 12 includes FIGS. 12a, 12b and 12c, where
Figure 12:
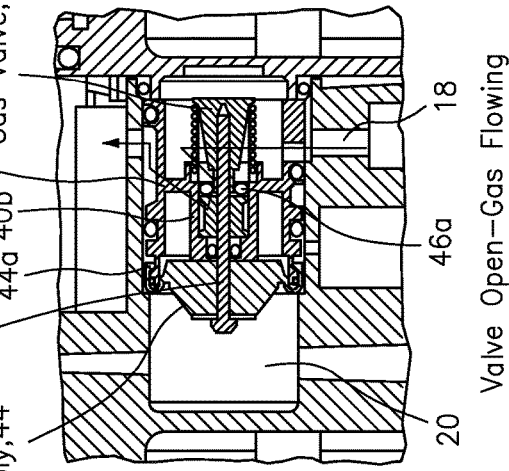
Figure 12:
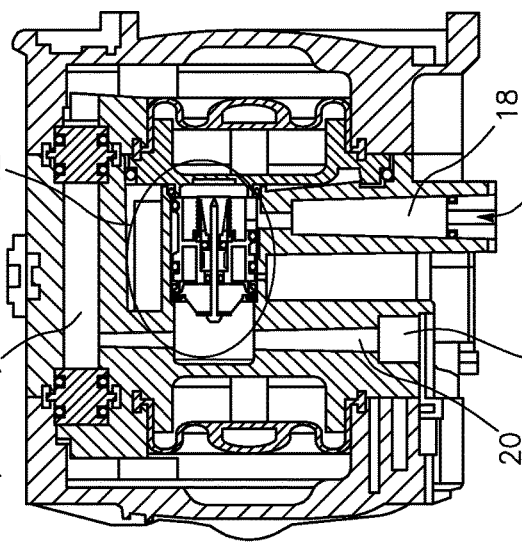

FIG. 12: The ASO Arrangement

By way of example, FIG. 12 shows the ASO arrangement or device 12', according to some embodiments of the present invention. The purpose of the ASO arrangement or device 12' is to stop the flow of compressed gas (remove power) to the pump when the syrup supply is exhausted or "sold out" (e.g., BIB emptied).

Consistent with that shown in FIGS. 12, 12a, 12b, 12c, the automatic shutoff (ASO) arrangement 12' may be configured in relation to the gas passageway 18 and the fluid passageway 20, and also configured to respond or activate when the vacuum force exceeds the predetermined level when the fluid is no longer being provided through the air operated diaphragm pump 10' via the fluid passageway 20 and to stop the gas from passing though the gas passageway 18 and the air operated diaphragm pump 10'. FIG. 12*b* show the ASO arrangement 12' in a valve open position allowing the gas to flow through a valve body 40. FIG. 12*c* show the ASO arrangement 12' in a valve closed position not allowing the gas to flow through a valve body 40.

The ASO arrangement 12' may include the valve body, a plunger shaft 42, a piston/diaphragm arrangement 44 and a gas valve or gas valve arrangement 46.

The valve body 40 may be configured to be in communication with the gas passageway 18 on a first end (left side as shown) and the fluid passageway 20 on a second end (right side as shown), and also configured to allow the gas to pass through in order to pump the fluid through the air operated diaphragm pump 10', as shown in FIG. 12*b*.

The plunger shaft 42 may be configured or arranged to move in the valve body 40.

The piston/diaphragm arrangement 44 may be arranged on one end (left side as shown) of the plunger shaft 42.

The gas valve 46 may be arranged on another end (right side as shown) of the plunger shaft 42.

In operation, the piston/diaphragm arrangement 44 may be configured to respond when the vacuum force exceeds the predetermined level when the fluid is no longer being provided through the air operated diaphragm pump via the fluid passageway 20, to move the plunger shaft 42 in the valve body 40, and to cause the gas valve 46 to stop the gas from passing though the gas passageway 18 and the air operated diaphragm pump 10'.

The piston/diaphragm arrangement 44 may also include a diaphragm 44*a* coupled to the second end (left side as shown) of the valve body 40 to seal the fluid passageway 20 from the gas passageway 18.

The gas valve 46 may be configured on the other end of the plunger shaft 42 to stop the gas from passing though the gas passageway 18 and the air operated diaphragm pump 10'.

The gas valve arrangement may include an O-ring 46*a* configured between the plunger shaft 42 and an inner gas channel portion 40*a* of the valve body 40. In operation, the gas valve 46 that may be configured to move against the O-ring 46*a* (moving left as shown) and stop the gas from passing though the gas passageway 18 and the air operated diaphragm pump 10', as shown in FIG. 12*c*.

The piston/diaphragm arrangement 44 may be configured to respond when the vacuum force does not exceed the predetermined level when the fluid is being provided through the air operated diaphragm pump 10' via the fluid passageway 20, to move the plunger shaft 42 in the valve body 40, and to cause the gas valve or gas valve arrangement 46 to allow the gas to pass though the gas passageway 18 and the air operated diaphragm pump 10', as shown in FIG. 12*b*.

Figure 14:
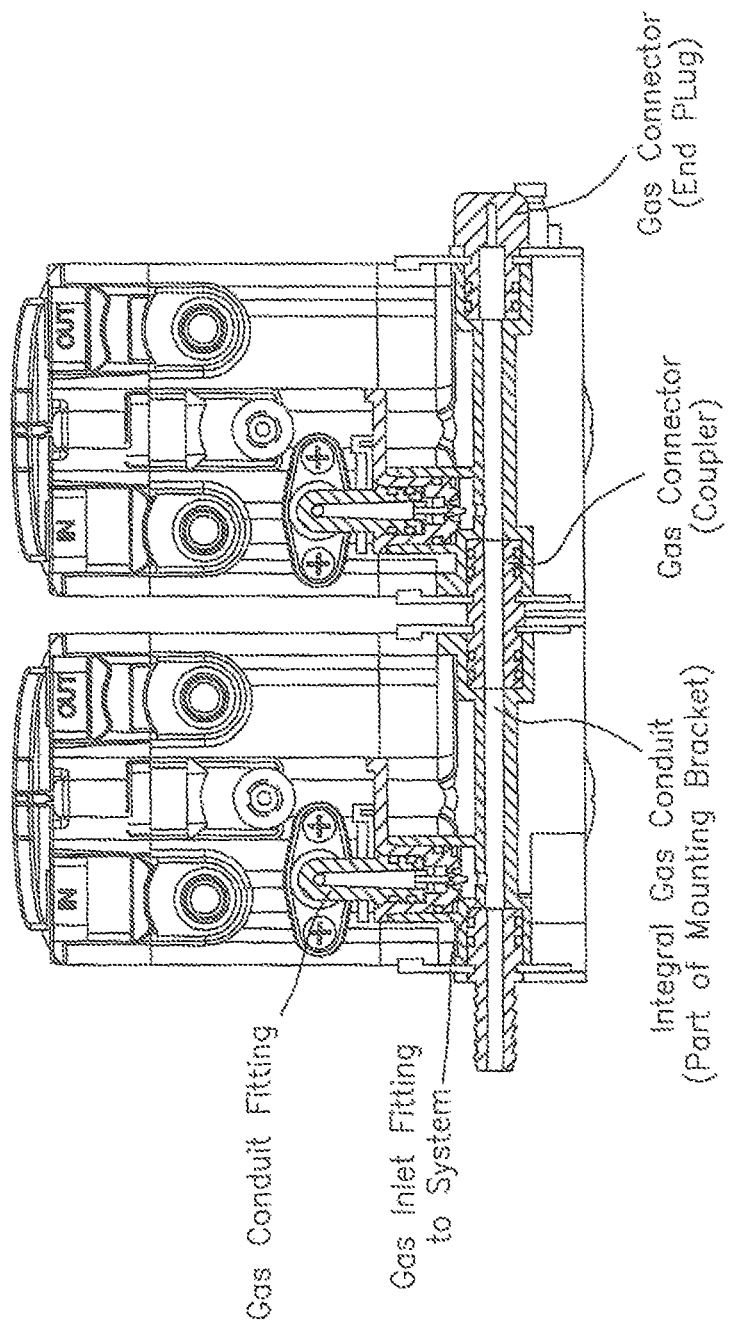
FIG. 14 shows a bottom view of side-by-side air-operated pumps like that shown in FIG. 5, according to some embodiments of the present invention.

FIG. 14 shows a gas conduit integrated into the mounting bracket, that can be coupled together using gas connector(s)/coupler(s) and an end plug as shown.

The ASO arrangement or device 12 work the same as the ASO arrangement or device 12'.

The Bracket 11

Features to secure the pump 10' to the bracket 11 includes mounting snaps, containment walls and alignment features. In addition, the bracket 11 may include features to secure the gas conduit from the pump 10' to the bracket 11 via a clip, e.g., a quick connect/disconnect clip. The design utilizes a check valve to block the escape of gas while the pump 10' is removed from service (FIG. 5).

Figure 7:
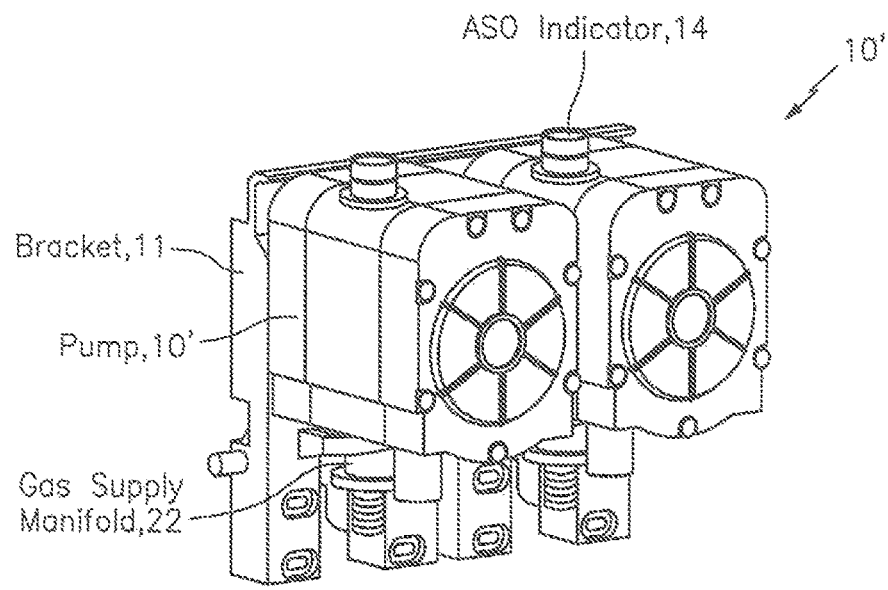
FIG. 7 shows a top perspective view of side-by-side air-operated pumps like that shown in FIG. 5, according to some embodiments of the present invention.
Figure 8:
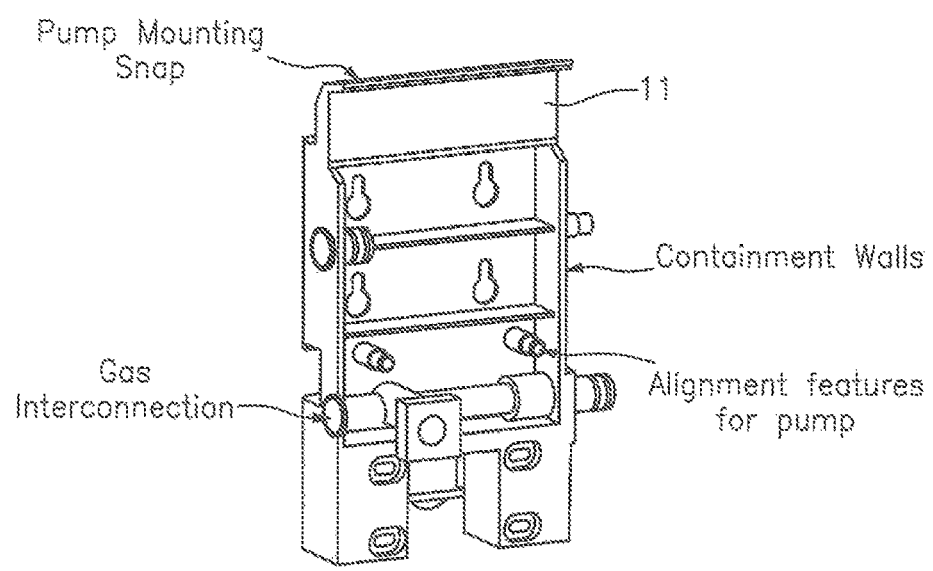
FIG. 8 shows a front view of a bracket, according to some embodiments of the present invention.

The exterior pump has been designed to interface with a new mounting bracket 11 (see FIG. 7). This new bracket incorporate features for three distinct functions:

1) Features to secure the pump to the bracket which includes geometry to channel and protect the gas supply (FIG. 8).

2) Features to accommodate three distinct mounting arrangements: Slide Track, Flex Rack, and simple wall mounting (FIG. 9).

Figure 10:
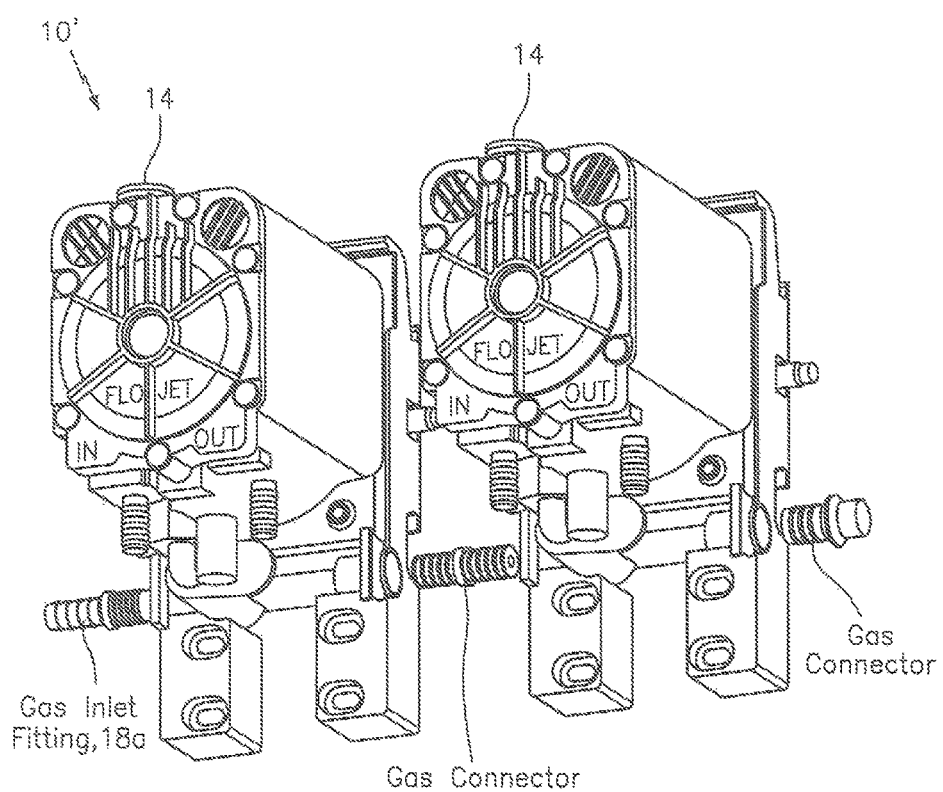
FIG. 10 shows a bottom perspective view of the side-by-side air-operated pumps shown in FIG. 7, according to some embodiments of the present invention.
Figure 11:
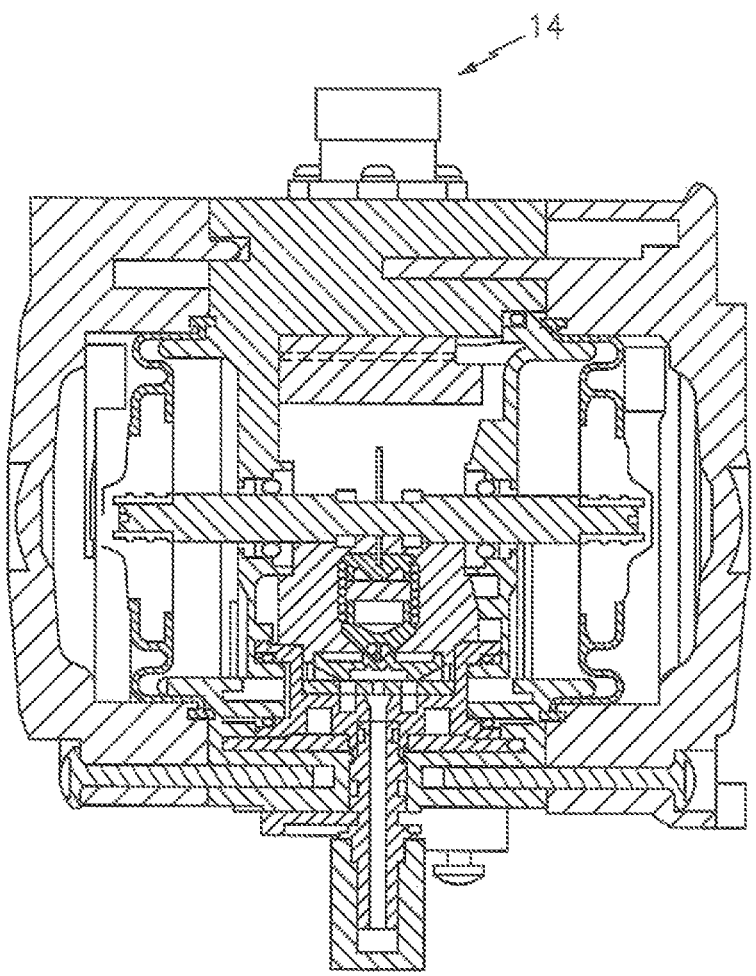
FIG. 11 shows another cross-sectional view of an air-operated pump in FIG. 5 (i.e., different from FIG. 6a), according to some embodiments of the present invention.

3) Geometry that forms a series of interconnecting gas channels and fitments so that each pump can be mounted to one another while providing an integral gas manifold (FIG. 10).

FIGS. 5-14 also show other parts and component that form part of the pump 10', but that do not form part of the underlying invention, thus are not described in further detail. A person skilled in the art would appreciate what these other parts and component are, and how they work to make the pump operate, consistent with that set forth herein, including the prior art pumps set forth above, and incorporated by references in their entirety.

List Possible Applications

By way of example, possible applications of some embodiments of the present invention include BIB syrup supply systems for post mix soft drink systems, post and premix alcoholic drink dispensing systems.

The Scope of the Invention

Further still, the embodiments shown and described in detail herein are provided by way of example only; and the scope of the invention is not intended to be limited to the particular configurations, dimensionalities, and/or design details of these parts or elements included herein. In other words, a person skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. An air operated diaphragm pump comprising:
    a housing having an orifice formed therein;
    a gas passageway configured to provide gas through the air operated diaphragm pump in order to pump syrup through the air operated diaphragm pump;
    a syrup passageway configured to provide the syrup through the air operated diaphragm pump when the gas is passed through the gas passageway, part of the syrup passageway configured in fluidic communication with the orifice of the housing with an inside pressure that is greater than an external pressure of the outside atmosphere when the syrup is passing through the air operated diaphragm pump via the syrup passageway; and an indicator arrangement configured to be received in the orifice of the housing to communicate with the syrup passageway, and also configured to respond or activate when a vacuum force exceeds a predetermined level when the syrup is no longer passing through the air operated diaphragm pump via the syrup passageway, and configured with a window to provide a visual indication when the syrup is no longer passing through the air operated diaphragm pump via the syrup passageway and the gas is no longer passing from a gas inlet port through the gas passageway and the air operated diaphragm pump;

wherein the indicator arrangement comprises:
an indicator housing member comprising an outer cylindrical wall portion having the window formed therein, an inner cylindrical wall portion and a connecting portion coupling the outer cylindrical wall portion and the inner cylindrical wall portion together so as to form a channel in between the outer cylindrical wall portion and the inner cylindrical wall portion; and a first diaphragm configured in the orifice to provide a seal between a circumferential rim of the orifice and the connecting portion of the indicator housing member.

2. An air operated diaphragm pump according to claim 1, wherein the indicator arrangement comprises:
a retainer member having a cylindrical surface with some indicia arranged thereon to provide the visual indication in the window when the syrup is no longer provided through the air operated diaphragm pump via the syrup passageway.

3. An air operated diaphragm pump according to claim 2, wherein the indicator housing member has a cylindrical configuration.

4. An air operated diaphragm pump according to claim 3, wherein the indicator arrangement comprises:
a piston configured to move inside the inner cylindrical wall portion of the indicator housing member, and having one end portion fixedly coupled to a center portion of the first diaphragm.

5. An air operated diaphragm pump according to claim 4, wherein the indicator arrangement comprises:
a retainer member having a corresponding cylindrical configuration and comprising:
an outer cylindrical wall portion,
an inner cylindrical wall portion and
a connecting portion coupling the outer cylindrical wall portion of the retainer member and the inner cylindrical wall portion of the retainer member together so as to form a channel in between the outer cylindrical wall portion of the retainer member and the inner cylindrical wall portion of the retainer member,
wherein the inner cylindrical wall of the retainer member is configured to form an inner cavity portion to receive another end portion of the piston,
wherein the outer cylindrical wall portion of the retainer member is configured to move in relation to the outer cylindrical wall portion of the indicator housing member, and comprises a cylindrical surface with some indicia arranged thereon to provide the visual indication in the window of the indicator housing member when the syrup is no longer provided through the air operated diaphragm pump via the syrup passageway.

6. An air operated diaphragm pump according to claim 5, wherein the indicator arrangement comprises:
an elastic member configured or arranged in the channel of the indicator housing member and the channel of the retainer member in compression between the indicator housing member and the retainer member.

7. An air operated diaphragm pump according to claim 6, wherein the indicator arrangement comprises:
a transparent cap configured to engage an outside portion of the outer cylindrical wall portion of the indicator housing member to hold, retain and contain the indicator arrangement together and to allow the viewing of the visual indication when the syrup is no longer provided through the air operated diaphragm pump via the syrup passageway.

8. An air operated diaphragm pump according to claim 4, wherein the indicator arrangement comprises:
an elastic member configured or arranged in the channel of the indicator housing member and the channel of the retainer member in compression between the indicator housing member and the retainer member,
wherein the elastic member is a spring and the piston is arranged inside the spring.

9. An air operated diaphragm pump according to claim 1, wherein the indicator arrangement comprises a flange configured to fasten the indicator arrangement to the housing in relation to the orifice.

10. An air operated diaphragm pump according to claim 1, wherein the indicator arrangement is located on a top surface of the pump so as to be viewable.

11. An air operated diaphragm pump according to claim 1, wherein
the first diaphragm of the indicator arrangement comprises a peripheral portion; and
the housing has the circumferential rim formed therein to receive the peripheral portion of the first diaphragm.

12. An air operated diaphragm pump according to claim 1, wherein the connecting portion of the indicator housing member coupling the outer cylindrical wall portion of the indicator housing member and the inner cylindrical wall portion of the indicator housing member together is disk-shaped;
wherein the indicator arrangement further comprises:
a piston configured to move inside the inner cylindrical wall portion of the indicator housing member, and having one end portion fixedly coupled to a center portion of the first diaphragm;
a retainer member having a corresponding cylindrical configuration and comprising an outer cylindrical wall portion, an inner cylindrical wall portion and a disk-shaped connecting portion coupling the outer cylindrical wall portion of the retainer member and the inner cylindrical wall portion of the retainer member together so as to form a channel in between the outer cylindrical wall portion of the retainer member and the inner cylindrical wall portion of the retainer member, the inner cylindrical wall portion of the retainer member configured to form an inner cavity portion to receive another end portion of the piston, the outer cylindrical wall portion of the retainer member configured to move in relation to the outer cylindrical wall portion of the indicator housing member, and having a cylindrical surface having some indicia arranged thereon to provide the visual indication in the window of the indicator housing member when the syrup is no longer provided through the air operated diaphragm pump via the syrup passageway; and an elastic member configured to be arranged in the channel of the indicator housing member and the channel of the retainer member in compression between the indicator housing member and the retainer member; and a transparent cap configured to engage an outside portion of the outer cylindrical wall portion of the indicator housing member to hold, retain and contain the indicator arrangement together and to allow the viewing of the visual indication when the syrup is no longer provided through the air operated diaphragm pump via the syrup passageway.

13. An air operated diaphragm pump according to claim 1, wherein the syrup passageway is formed between a syrup inlet port and a suction plenum or channel; and wherein the air operated diaphragm pump further comprises:

an automatic shutoff (ASO) arrangement having a valve body having a first end and a second end and arranged between the gas inlet port of the gas passageway and the syrup inlet port of the syrup passageway, and a piston/diaphragm arrangement comprising a second diaphragm coupled to the second end of the valve body and arranged in the syrup passageway between the syrup inlet port and the suction plenum or channel, and configured to seal the syrup passageway from the gas passageway;

wherein the ASO arrangement is configured to respond or activate when a vacuum force exceeds a predetermined level when the syrup is no longer provided to the syrup inlet port through the air operated diaphragm pump via the syrup passageway, and stop the gas from passing from the gas inlet port through the gas passageway and the air operated diaphragm pump.

14. An air operated diaphragm pump according to claim 13, wherein the ASO arrangement comprises:

the valve body configured to be in communication with the gas passageway on the first end and the syrup passageway on the second end, and also configured to allow the gas to pass through in order to pump the syrup through the air operated diaphragm pump;

a plunger shaft arranged to move in the valve body;

the piston/diaphragm arrangement arranged on one end of the plunger shaft;

a gas valve arrangement arranged on another end of the plunger shaft;

the piston/diaphragm arrangement configured to respond when the vacuum force exceeds the predetermined level when the syrup is no longer provided through the air operated diaphragm pump via the syrup passageway, to move the plunger shaft in the valve body, and to cause the gas valve arrangement to stop the gas from passing through the gas passageway and the air operated diaphragm pump.

15. An air operated diaphragm pump according to claim 14, wherein the piston/diaphragm arrangement senses pressure in the syrup passageway and reacts by closing the gas valve connected to the piston/diaphragm arrangement via the plunger shaft.

16. An air operated diaphragm pump according to claim 14, wherein the gas valve arrangement comprises:

the gas valve configured on the another end of the plunger shaft to stop the gas from passing through the gas passageway and the air operated diaphragm pump.

17. An air operated diaphragm pump according to claim 16, wherein the gas valve arrangement comprises an O-ring configured between the plunger shaft and an inner gas channel portion of the valve body; and wherein the gas valve is configured to move against the O-ring and stop the gas from passing through the gas passageway and the air operated diaphragm pump.

18. An air operated diaphragm pump according to claim 14, wherein the piston/diaphragm arrangement is configured to respond when the vacuum force does not exceed the predetermined level when the syrup is provided through the air operated diaphragm pump via the syrup passageway, to move the plunger shaft in the valve body, and to cause the gas valve arrangement to allow the gas to pass through the gas passageway and the air operated diaphragm pump.

19. An air operated diaphragm pump according to claim 14, wherein the ASO arrangement comprises an adjusting gland and an elastic member, including a coil spring, configured to adjust the predetermined level that the vacuum force may need to exceed when the syrup is no longer provided through the air operated diaphragm pump via the syrup passageway in order to stop the gas from passing through the gas passageway and the air operated diaphragm pump.

20. An air operated diaphragm pump according to claim 19, wherein the adjusting gland may be configured to be adjusted by being screwed into and/or out of the housing to compress or relax associated compression of the elastic member.

* * * * *